(12) United States Patent
Lection et al.

(10) Patent No.: US 8,214,731 B2
(45) Date of Patent: Jul. 3, 2012

(54) INDEPENDENTLY REFRESHING PORTLET CONTENT IN A PORTAL VIEW

(75) Inventors: David B. Lection, Raleigh, NC (US);
Eric L. Masselle, Raleigh, NC (US);
Mohamad R. Salahshoor, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 2061 days.

(21) Appl. No.: 11/170,916

(22) Filed: Jun. 30, 2005

(65) Prior Publication Data
US 2007/0006075 A1 Jan. 4, 2007

(51) Int. Cl.
*G06N 3/00* (2006.01)
(52) U.S. Cl. .......................................... 715/200
(58) Field of Classification Search .................. 715/513, 715/517, 523, 530, 234, 243, 254, 200, 201
See application file for complete search history.

(56) References Cited

U.S. PATENT DOCUMENTS

| | | | |
|---|---|---|---|
| 6,327,628 B1 | 12/2001 | Anuff et al. | |
| 6,677,964 B1 | 1/2004 | Nason et al. | |
| 6,735,586 B2 | 5/2004 | Timmons | |
| 7,349,968 B2 | 3/2008 | Johnson | |
| 7,756,982 B2 | 7/2010 | Johnson | |
| 2002/0087667 A1 | 7/2002 | Andersen | |
| 2002/0138624 A1 | 9/2002 | Esenther | |
| 2003/0167315 A1 | 9/2003 | Chowdhry et al. | |
| 2004/0122971 A1 | 6/2004 | Joshi et al. | |
| 2004/0205555 A1* | 10/2004 | Hind et al. | 715/513 |
| 2004/0230901 A1 | 11/2004 | Godwin et al. | |
| 2004/0243928 A1 | 12/2004 | Hesmer et al. | |
| 2006/0005137 A1 | 1/2006 | Jolley | |
| 2007/0005731 A1* | 1/2007 | Lection et al. | 709/219 |

FOREIGN PATENT DOCUMENTS
WO 02/084534 A2 10/2002

OTHER PUBLICATIONS

*A process for the blending of web content*, Research Disclosure, Apr. 2000, pp. 778-779.
Pierce, Marlon et al; *Interoperable Web Services for Computational Portals*, 0-7695-1524-X/02, 2002, IEEE, pp. 1-12.
Ginsburg, Mark, *The Catacomb Project: Building a User-Centered Portal the Conversational Way*, WIDM '02, Nov. 8, 2002, pp. 84-87.
Donnelly, Vanessa, et al, *Community Portals Through Communitization*, CUU '03, Nov. 10-11, 2003, Vancouver, British Columbia, CA, pp. 9-14.

(Continued)

*Primary Examiner* — Kyle Stork
(74) *Attorney, Agent, or Firm* — Cuenot, Forsythe & Kim, LLC

(57) ABSTRACT

Embodiments of the present invention address deficiencies of the art in respect to portlet content refreshing and provide a novel and non-obvious method, system and apparatus for independently refreshing portlet content in a portal view. In an embodiment of the invention, a system for refreshing portlet content in a portal view can include a portal server configured to render a portal page, a portlet aggregator configured to provide portlet markup for different portlets in different refresh controllers having independently refreshable portions, and a refresh servlet coupled to the portlet aggregator that includes programming to configure the portal page with the different refresh controllers.

19 Claims, 2 Drawing Sheets

OTHER PUBLICATIONS

Bellas, Fernando, et al, *A Flexible Framework for Engineering "My" Portals*, WWW 2004, May 17-22, 2004, NY, ACM 1-58113-844-X/04/0005, pp. 234-242.

Mike; How to Update Portlet Information Every X Seconds—Stock Ticker . . . Weather Updates . . . ; Enterprise Portals & JSR 168 Portlets [online] Feb. 23, 2005, pp. 1-2, XP002397761; retrieved from the Internet on Sep. 5, 2006.

Ziebold, G., et al; Asynchronous Rendering of Portlet Content with AJAX Technology; Sun Developer Network (SDN), [online], Jun. 6, 2005, pp. 1-3, XP002397762; retrieved from the Internet Sep. 5, 2006.

Lupi, R.; [Zope] Refreshing the Content; MAIL.ZOPE.ORG, [online] Oct. 7, 2004, pp. 1-1, XP002397763; retrieved from the Internet Sep. 5, 2006.

Developing Portlets; E-DOCS.BEA.COM, [online] Apr. 1, 2006, pp. 1-175, XP002397764; retrieved from the Internet Sep. 5, 2006.

"Optimizing and minimizing portlet round trips to a portal server," Research Disclosure, Mason Publications, Hampshire, GB, vol. 449, No. 86 Sep. 2001, XP007128940.

BEA WebLogic: "Developing Portlets," Internet Citation, [Online] 2000, pp. 1-11, X002314066, Retrieved from the Internet, URL:http://e-docs.bea.com/wlcs/docs31/p13ndev/portlets.htm, [retrieved Jan. 19, 2005].

\* cited by examiner

INDEPENDENTLY REFRESHING PORTLET CONTENT IN A PORTAL VIEW

BACKGROUND OF THE INVENTION

1. Field of the Invention

The present invention relates to the field of portal environment management and more particularly to refreshing portlet content within a portal view.

2. Description of the Related Art

Distributing content about large computer communications networks is not without its challenges. In particular, the quantity of content available for distribution in a computer communications network often varies proportionally to the size of the computer communications network. At the extreme, the Internet hosts a vast quantity of content not easily accessible by most end-users. Portals represent a sensible solution to the problem of aggregating content through a channel paradigm in a single, network-addressable location. In consequence, portals have become the rage in content distribution.

Portlets are the visible active components included as part of portal pages. Similar to the graphical windows paradigm of windowing operating systems, each portlet in a portal occupies a portion of the portal page through which the portlet can display associated content from a portlet channel. Portlets are known to include both simple applications such as an electronic mail client, and also more complex applications such as forecasting output from a customer relationship management system. The prototypical portlet can be implemented as server-side scripts executed through a portal server.

From the end-user perspective, a portlet is a content channel or application to which the end-user can subscribe. By comparison, from the perspective of the content provider, a portlet is a means through which content can be distributed in a personalized manner to a subscribing end-user. Finally, from the point of view of the portal, a portlet merely is a component which can be rendered within the portal page. In any case, by providing one or more individually selectable and configurable portlets in a portal, portal providers can distribute content and applications through a unified interface in a personalized manner according to the preferences of the end-user.

Portal servers are computer programs which facilitate the distribution of portal based Web sites on the public Internet or a private intranet. Importantly, it will be recognized by one of ordinary skill in the art that the signature characteristic of all conventional portal servers can include the aggregation of content from several portlet applications within a single distributable page in a uniform manner. To that end, each portlet application within the portal page can be represented by a portlet user interface distributed by the portal server to requesting client computing devices.

Portals display an aggregation of markup that can, and frequently does, originate from multiple content sources. The performance and availability of any one of these sources can have a profound effect upon the end user experience with a portal, since the entire portal display must be aggregated prior to rendering the portal in a client viewer. Specifically, aggregation complicates the notion of refresh, and the Web based interface of a portal can compound matters further. In this regard, portlets running in the portal view that require a timely refresh cannot do so without interrupting the display of neighboring portlets. This type of interruption can be distracting and a source of frustration for the end user.

BRIEF SUMMARY OF THE INVENTION

Embodiments of the present invention address deficiencies of the art in respect to portlet content refreshing and provide a novel and non-obvious method, system and apparatus for independently refreshing portlet content in a portal view. In an embodiment of the invention, a system for refreshing portlet content in a portal view can include a portal server configured to render a portal page, a portlet aggregator configured to provide portlet markup for different portlets in different refresh controllers having independently refreshable portions, and a refresh servlet coupled to the portlet aggregator that includes programming to configure the portal page with the different refresh controllers.

In one aspect of the invention, the different refresh controllers can be linked to the portal page through corresponding hidden frames disposed in the portal page. Moreover, each of the different refresh controllers can include a script programmed to write contained portlet markup to an element in the portal page responsive to a triggering event, such as an on load event. Finally, the portlet markup for the different portlets each can include at least one refresh tag. The refresh tag can include an element type, an element identifier, an address for refreshable content for an element in the portlet markup associated with the element identifier, and a refresh rate. Also, the portlet markup for the different portlets each can include one or more refresh tags for different portions of the portlet markup.

In another embodiment can provide for a method for refreshing portlet content in a portal view. The method can include receiving a call from a refresh tag in portlet markup for a portlet among portlets in the portal view. Responsive to the receipt of the call, a refresh controller can be generated for the portlet markup. A script can be embedded in the refresh controller, the script including code enabled to provide content in the refresh controller to the portal page. The refresh controller can be linked to a hidden frame in the portal page. Finally, the hidden frame can be provided to an aggregator for assembly into the portal page.

Notably, the method can include extracting a refresh rate from the call from the refresh tag. In this regard, the embedding step can include enabling the code to periodically refresh the content in the refresh controller at a rate consistent with the refresh rate. Also, the extracting step further can include extracting a push type and a push identifier for a portion of the portlet markup from the call from the refresh tag. In this case, the embedding step can include selecting the script for embedding in the refresh controller according to a template corresponding to the push type. Moreover, the embedding step further can include enabling the code to periodically refresh content for the portion in the refresh controller indicated by the push identifier at a rate consistent with the refresh rate.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being

DETAILED DESCRIPTION OF THE INVENTION

Embodiments of the present invention provide a method, system and computer program product for independently refreshing portlet content in a portal view. In an embodiment of the invention, a refresh tags specifying different refresh intervals can be included in correspondingly different portlet content. The refresh tags can be separately processed in a refresh servlet to produce separate refresh controller documents, each linked to a hidden frame in the portal view, and each including a script controlling the refreshing of corresponding portlet content. Subsequently, an aggregator for the portal view can include the portlet content in each hidden frame in the portal view, and the aggregator can periodically refresh the different portlet content in the portal view independently accordingly to the specified, different intervals. In this way, different elements of the portal view can be refreshed at different intervals without interfering with the display of neighboring elements in the portal view.

Figure 1:
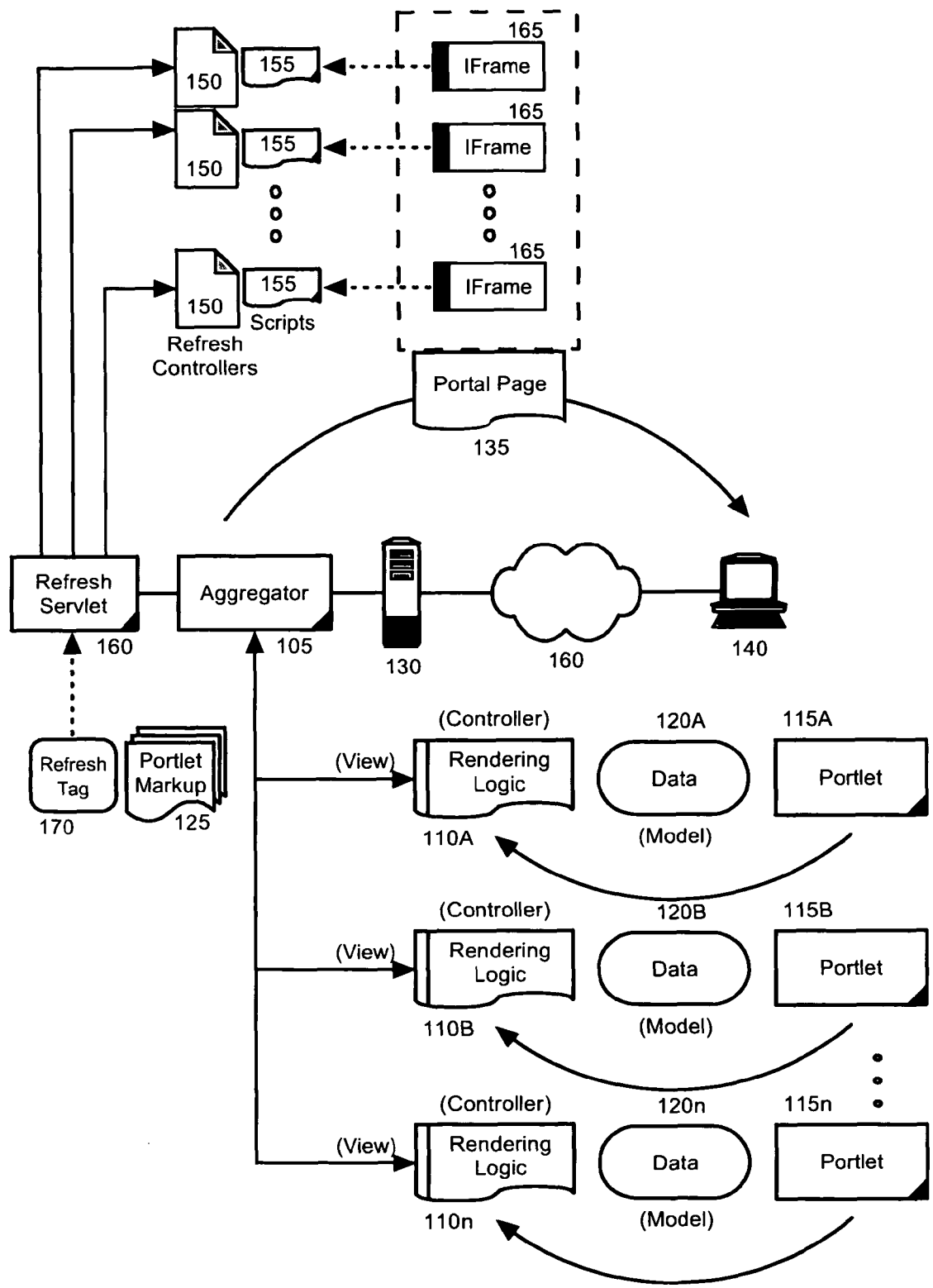
FIG. 1 is a schematic illustration of a portal environment configured to accommodate the independent refreshing of portlet content in a portal view; and, FIG. 2 is a flow chart illustrating a method for independently refreshing portlet content in a portal view.

In more particular illustration, FIG. 1 is a schematic illustration of a portal server system which has been configured to independently refresh portlet content in a portal view. The portal server system can include a portal page 135 communicatively coupled to a selection of portlet applications 115A, 115B, 115n through a portal server 130. Each portlet application 115A, 115B, 115n can produce a view based upon portlet data 120A, 120B, 120n in the form of portlet markup 125 through corresponding rendering logic 110A, 110B, 110n. Notably, the rendering logic 110A, 110B, 110n can be active markup such as a JSP, in which logical scriptlets can be embedded to produce specific markup language tags.

A portlet aggregator 105 can be coupled to each portlet application 115A, 115B, 115n to receive the portlet markup 125 and to aggregate the portlet markup 125 into view in the portal page 135. By aggregation, it is meant that the individual markup language blocks produced by each portlet 115A, 115B, 115n can be combined into a single cohesive markup language document configured for distribution to and use within a conventional content browser. In this regard, the portal page 135 can be disposed in the portal server 130 from which the portal 135 can be accessed by client content browsing devices 140 over a computer communications network 160 such as a local computer communications network, for instance a private intranet, or a global computer communications network, for instance the public Internet.

In accordance with an embodiment of the present invention, a refresh tag 170 can be embedded in portlet markup 125 to indicate that at least a portion of the content of portlet markup 125 is to be refreshed at a specified interval. In this regard, the refresh tag 170 can be incorporated in the portlet markup 125 multiple times to achieve multiple independent refreshing of different elements within the portlet markup 125 of a portlet. The refresh tag 170 can include several parameters helpful in controlling the independent refreshing of a specified portion of the portlet markup 125.

For example, the parameters can include a push type indicating the type of element in the portlet markup 125 which is to be refreshed and a push identifier for uniquely identifying the element to be refreshed. Push types can include a popup window of the portlet markup 125, a field within a form in the portlet markup 125, and a document indicating the visual markup elements of the portlet markup 125, to name only a few. The parameters also can include a network or file system address for the source of the content to be refreshed in the uniquely identified element in the portlet markup 125. Finally, the refresh tag 170 can include a refresh rate indicating how often the content for the uniquely identified element in the portlet markup 125 is to be refreshed. The refresh rate can include a specified integer rate, or a formulaically derived rate.

A refresh servlet 160 can be coupled to the aggregator 105. The refresh tag 170 can call the refresh servlet 160 to write a corresponding refresh controller 150 utilizing parameters provided by the refresh tag 170. The refresh controller 150 can be a document containing visual markup such as hypertext markup language (HTML). The refresh controller 150 can include a hidden frame, such as a hidden inline frame. The inline frame can reference the network or file system address for the source of the content to be refreshed in the uniquely identified element in the portlet markup 125 as noted by the refresh tag 170.

The refresh controller 150 also can include a script 155 to write the portlet markup 125 of the refresh controller 150 to a designated element in the portal page 135. The script 155 can be templated and selected according to the push type indicated by the refresh tag 170 and can be executed when an "on load" triggering event occurs in the refresh controller 150. Finally, the aggregator 105 can configure the portal page 135 with hidden frames 165, each hidden frame referring to one of the refresh controllers 150. To that end, the script 155 can reference a corresponding "span" in a corresponding refresh controller 150 so as to cause the refreshing of the content in the designated element in the portal page 135 with the refreshed content incorporated within the hidden frame 165.

Optionally, one refresh controller 150 can be created for the entire portal page 135 where the refresh controller 150 contains all of the scripts 155 and hidden frames fore each refreshed element in all portlets 115A, 115B, 115n on the portal page 135. Alternatively, one refresh controller 150 can be created for each portlet 115A, 115B, 115n, where each refresh controller 150 contains all of the scripts 155 and all of the hidden frames for aech refreshed element within the portlet 115A, 115B, 115n. Finally, as yet another alternative, one refresh controller 150 can be created for each refreshed element in a portlet 115A, 115B, 115n in a portal page 135.

In consequence of the foregoing arrangement, each of the portlets 115A, 115B, 115C can provide its corresponding markup to a refresh controller 150 rather than a single document (the portal page 135, itself). Further, each of the refresh controllers 150, can write its respective content—when that content is ready to render according the refresh rate specified by a corresponding refresh tag 170—to an element of the portal page 135. Since no one of the portlets 115A, 115B, 115C need wait for any other of the portlets 115A, 115B, 115C to construct markup, the markup stream for the portal page 135 can be displayed immediately and each of the portlets 115A, 115B, 115C can enjoy independent refreshing in the portal view 135.

Figure 2:
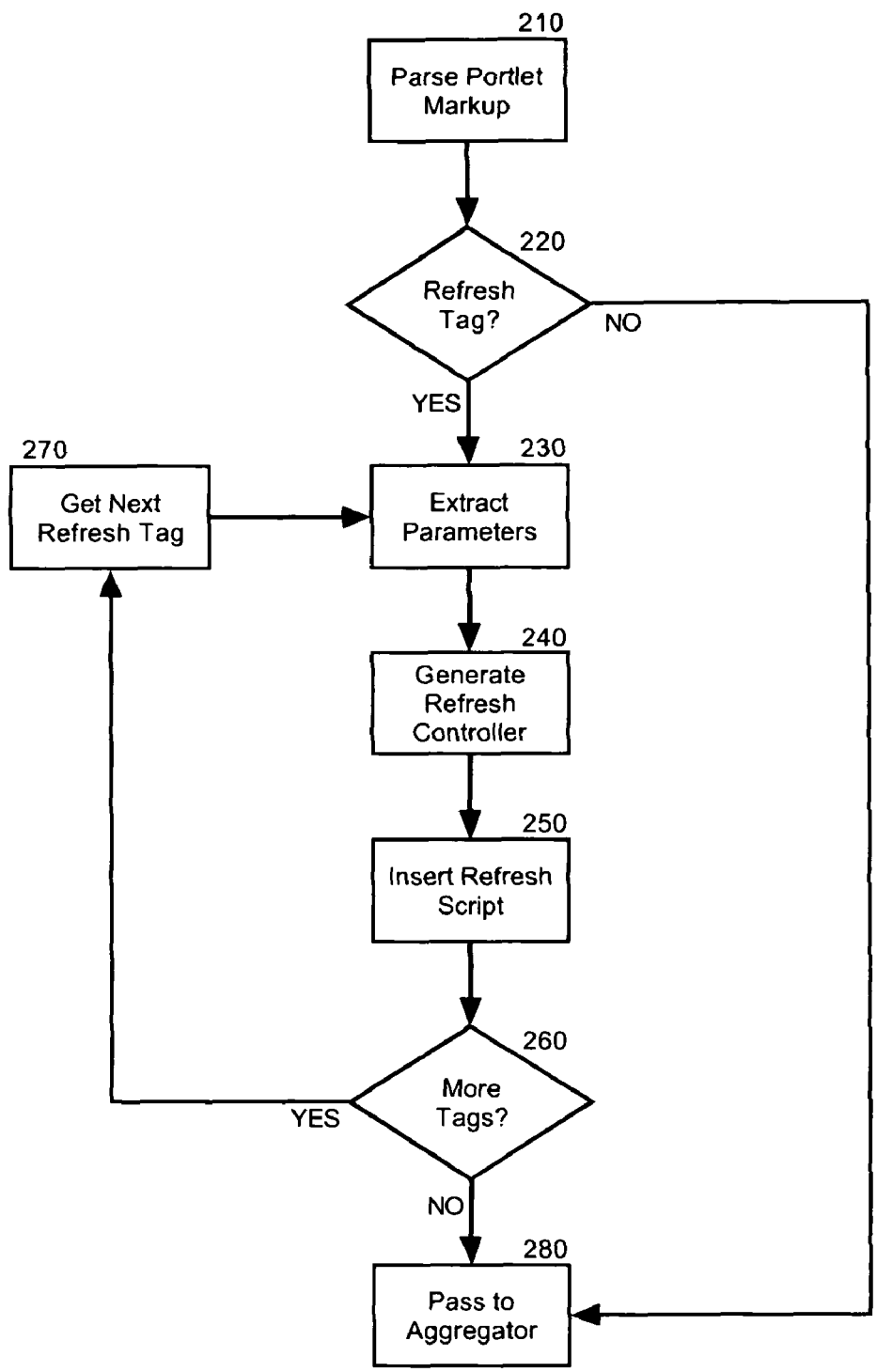

In further illustration of the operation of the refresh servlet 160 of the portal system of FIG. 1, FIG. 2 is a flow chart illustrating a method for independently refreshing portlet content in a portal view. Beginning in block 210, a refresh call can be received for refreshing content in a portlet. In block 220, parameters for the refresh call can be extracted. Specifically, a push type, push identifier, content source and refresh rate can be extracted for the refresh tag. Subsequently, in block 230 a refresh controller can be generated for at least a portion of the portlet markup as designated by the push identifier and push type. To that end, the designated portion of the portlet markup can range from a mere field in a form in the portlet markup, to an entire HTML document in the portlet markup.

In any case, in block 240, a refresh script can be included in the refresh controller, which refresh script can cause the refreshing of the content for the designated portion of the portlet market at the specified refresh rate. In decision block 250, it can be determined if additional refresh calls remain to be processed. If so, the process can continue through block 260 in which a next refresh tag can be selected for processing and the process can repeat in blocks 230 through 260. When no further refresh calls remain to be processed in the portlet markup, in block 270 the portlet markup can be passed to the aggegrator for aggregation into the portal view.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microc ode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A system for refreshing portlet content in a portal view comprising:
   a portal server including a hardware processor configure to render a portal page;
   a portlet aggregator configured to provide a portlet markup for different portlets in different refresh controllers having independently refreshable portions; and,
   a refresh servlet coupled to said portlet aggregator and comprising programming to configure said portal page with said different refresh controllers.

2. The system of claim 1, wherein said different refresh controllers are linked to said portal page through corresponding hidden frames disposed in said portal page.

3. The system of claim 2, wherein said hidden frames comprise inline frames.

4. The system of claim 1, wherein each of said different refresh controllers comprises a script programmed to write contained portlet markup to an element in said portal page responsive to a triggering event.

5. The system of claim 4, wherein said triggering event is an on load event.

6. The system of claim 1, wherein said portlet markup for said different portlets each comprises at least one refresh tag, said refresh tag comprising an element type, an element identifier, an address for refreshable content for an element in said portlet markup associated with said element identifier, and a refresh rate.

7. The system of claim 6, wherein said portlet markup for said different portlets each comprises a plurality of refresh tags for different portions of said portlet markup, each of said refresh tags comprising an element type, an element identifier, an address for refreshable content for an element in said portlet markup associated with said element identifier, and a refresh rate.

8. A method for refreshing portlet content in a portal view, the method comprising:
   receiving a call from a refresh tag in portlet markup for a portlet among portlets in the portal view;
   responsive to said receipt, generating a refresh controller for said portlet markup;
   embedding a script in said refresh controller, said script comprising code enabled to provide content in said refresh controller to said portal page;
   linking said refresh controller to a hidden frame in the portal page; and,
   providing said hidden frame to an aggregator for assembly into the portal page.

9. The method of claim 8, further comprising extracting a refresh rate from said call from said refresh tag.

10. The method of claim 9, wherein said embedding a script in said refresh controller further comprises enabling said code to periodically refresh said content in said refresh controller at a rate consistent with said refresh rate.

11. The method of claim 9, wherein said extracting a refresh rate from said call from said refresh tag further comprises extracting a push type and a push identifier for a portion of said portlet markup from said call from said refresh tag.

12. The method of claim 11, wherein said embedding a script in said refresh controller further comprises selecting said script for embedding in said refresh controller according to a template corresponding to said push type.

13. The method of claim 11, wherein said embedding a script in said refresh controller further comprises enabling said code to periodically refresh content for said portion in said refresh controller indicated by said push identifier at a rate consistent with said refresh rate.

14. A computer program product comprising a hardware device having computer usable program code for refreshing portlet content in a portal view, said computer program product including:
   computer usable program code for receiving a call from a refresh tag in portlet markup for a portlet among portlets in the portal view;

computer usable program code for responsive to said receipt, generating a refresh controller for said portlet markup;

computer usable program code for embedding a script in said refresh controller, said script comprising code enabled to provide content in said refresh controller to said portal page;

computer usable program code for linking said refresh controller to a hidden frame in the portal page; and, computer usable program code for providing said hidden frame to an aggregator for assembly into the portal page.

15. The computer program product of claim 14, further comprising computer usable program code for extracting a refresh rate from said call from said refresh tag.

16. The computer program product of claim 15, wherein said computer usable program code for embedding a script in said refresh controller further comprises computer usable program code for enabling said code to periodically refresh said content in said refresh controller at a rate consistent with said refresh rate.

17. The computer program product of claim 15, wherein said computer usable program code for extracting a refresh rate from said call from said refresh tag further comprises computer usable program code for extracting a push type and a push identifier for a portion of said portlet markup from said call from said refresh tag.

18. The computer program product of claim 17, wherein said computer usable program code for embedding a script in said refresh controller further comprises computer usable program code for selecting said script for embedding in said refresh controller according to a template corresponding to said push type.

19. The computer program product of claim 17, wherein said computer usable program code for embedding a script in said refresh controller further comprises computer usable program code for enabling said code to periodically refresh content for said portion in said refresh controller indicated by said push identifier at a rate consistent with said refresh rate.

* * * * *